US012585585B2

(12) United States Patent
Yang

(10) Patent No.: US 12,585,585 B2
(45) Date of Patent: Mar. 24, 2026

(54) MEMORY DEVICE CONTROL METHOD AND ASSOCIATED APPARATUS FOR EFFICIENT DECODING IN USING SYNDROME WEIGHT

(71) Applicant: Silicon Motion, Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/810,473

(22) Filed: Aug. 20, 2024

(65) Prior Publication Data

US 2025/0077418 A1     Mar. 6, 2025

Related U.S. Application Data

(60) Provisional application No. 63/536,055, filed on Aug. 31, 2023.

(30) Foreign Application Priority Data

May 31, 2024    (TW) ................................. 113120290

(51) Int. Cl.
*G06F 12/02*          (2006.01)
(52) U.S. Cl.
CPC ................................. *G06F 12/0246* (2013.01)
(58) Field of Classification Search
CPC ............... G06F 12/0246; G06F 3/0679; G06F 11/1068; G06F 11/1048; G06F 11/1012; G06F 11/108; G06F 11/1076; G06F 3/061; G06F 3/064; G06F 3/0619; G06F 12/0882; G06F 2212/2022

USPC ......... 711/103, 12.008, 12.001, 102, 12.017, 711/12.002, 114, 154, 118
See application file for complete search history.

(56) References Cited

U.S. PATENT DOCUMENTS

| | | | | |
|---|---|---|---|---|
| 8,572,465 | B2 | 10/2013 | Uchikawa | |
| 8,739,000 | B2 * | 5/2014 | Ryan ....................... | H04L 1/203 |
| | | | | 714/701 |
| 9,898,363 | B2 | 2/2018 | Kim | |

(Continued)

FOREIGN PATENT DOCUMENTS

| | | |
|---|---|---|
| CN | 103544073 A | 1/2014 |
| CN | 107452421 A | 12/2017 |

(Continued)

*Primary Examiner* — Jared I Rutz
*Assistant Examiner* — Edward Waddy, Jr.
(74) *Attorney, Agent, or Firm* — Winston Hsu

(57)          ABSTRACT

A control method of a memory device includes: reading and decoding first data of a first chunk, wherein the first chunk is located in a first data page of a super data page, and the super data page includes multiple data pages respectively located in multiple data planes; in response to the first chunk failing to be decoded, obtaining data of multiple corresponding chunks of the first chunk, wherein the multiple corresponding chunks are located in other data pages of the super data page; and in response to all of the data in the multiple corresponding chunks not being successfully decoded, determining whether to give up the decoding operation of the first chunk according to a symptom weight of the first chunk and at least one symptom weight of at least one corresponding chunk.

15 Claims, 9 Drawing Sheets

(56)     References Cited

U.S. PATENT DOCUMENTS

| | | | |
|---|---|---|---|
| 10,176,041 B2 | 1/2019 | Wu | |
| 2006/0274577 A1 | 12/2006 | Pascucci | |
| 2014/0026018 A1 | 1/2014 | Yang | |
| 2017/0168894 A1 | 6/2017 | Kim | |
| 2017/0294217 A1 | 10/2017 | Lin | |
| 2018/0012663 A1* | 1/2018 | Alhussien | H03M 13/1111 |
| 2019/0081641 A1 | 3/2019 | Symons | |
| 2019/0384671 A1* | 12/2019 | Chen | G06F 11/1068 |
| 2020/0057572 A1 | 2/2020 | Lin | |
| 2020/0057693 A1* | 2/2020 | Kim | G11C 29/52 |
| 2020/0319964 A1* | 10/2020 | Kim | G06F 11/1489 |
| 2020/0373944 A1* | 11/2020 | Cho | G06F 11/1048 |
| 2021/0306003 A1 | 9/2021 | Kim | |
| 2023/0035079 A1* | 2/2023 | Han | G06F 3/0619 |
| 2025/0377794 A1 | 12/2025 | Shikata | |

FOREIGN PATENT DOCUMENTS

| | | | |
|---|---|---|---|
| TW | I466123 B | 12/2014 | |
| TW | I612527 B | 1/2018 | |
| TW | I804359 B | 6/2023 | |

* cited by examiner

MEMORY DEVICE CONTROL METHOD AND ASSOCIATED APPARATUS FOR EFFICIENT DECODING IN USING SYNDROME WEIGHT

CROSS REFERENCE TO RELATED APPLICATIONS

This application claims the benefit of U.S. Provisional Application No. 63/536,055, filed on Aug. 31, 2023. The content of the application is incorporated herein by reference.

BACKGROUND OF THE INVENTION

1. Field of the Invention

The present invention is related to a flash memory, and more particularly, to a flash memory controller adopting an efficient redundant array of independent disks (RAID) decoding method.

2. Description of the Prior Art

In order to protect data in a flash memory module, an encoder in a flash memory controller will adopt a RAID encoding method to encode the data for generating multiple parities. As the flash memory process shrinks and develops towards a 3-dimensional array, the probability that the flash memory cannot be successfully decoded by the low-density parity-check (LDPC) code when being read increases significantly. As a result, the number of times the RAID needs to be used for decoding increases, and the time required for decoding by the RAID is quite long, which leads to a decreased decoding efficiency.

SUMMARY OF THE INVENTION

It is therefore one of the objectives of the present invention to provide a flash memory controller adopting an efficient RAID decoding method, in order to address the above-mentioned issues.

According to an embodiment of the present invention, a control method of a memory device is provided, wherein the memory device comprises a flash memory module, the flash memory module comprises multiple data planes, each of the multiple data planes comprises multiple blocks, each of the multiple blocks comprises multiple data pages, and each of the multiple data pages comprises multiple chunks. The control method comprises: reading first data from a first chunk for performing a decoding operation, wherein the first chunk is located in a first data page of a super data page, and the super data page comprises the multiple data pages respectively located in the multiple data planes; in response to the first chunk failing to be decoded, obtaining data of multiple corresponding chunks of the first chunk, wherein the multiple corresponding chunks are respectively located in other data pages of the super data page except for the first data page; in response to all of the data of the multiple corresponding chunks being successfully decoded, generating decoded data of a specific chunk according to multiple decoded data of the multiple corresponding chunks; and in response to all of the data of the multiple corresponding chunks not being successfully decoded, determining whether to give up the decoding operation of the first chunk according to a syndrome weight of the first chunk and at least one syndrome weight of at least one corresponding chunk among the multiple corresponding chunks that is not successfully decoded.

According to an embodiment of the present invention, a flash memory controller is provided, wherein the flash memory controller is arranged to access a flash memory module, the flash memory module comprises multiple data planes, each of the multiple data planes comprises multiple blocks, each of the multiple blocks comprises multiple data pages, and each of the multiple data pages comprises multiple chunks. The flash memory controller comprises a read only memory, a buffer memory, and a microprocessor, wherein the read only memory is arranged to store a program code, and the microprocessor is arranged to execute the program code to control access of the flash memory module. The microprocessor is arranged to perform the following steps: reading first data from a first chunk for performing a decoding operation, wherein the first chunk is located in a first data page of a super data page, and the super data page comprises the multiple data pages respectively located in the multiple data planes; in response to the first chunk failing to be decoded, obtaining data of multiple corresponding chunks of the first chunk, wherein the multiple corresponding chunks are respectively located in other data pages of the super data page except for the first data page; in response to all of the data of the multiple corresponding chunks being successfully decoded, generating decoded data of a specific chunk according to multiple decoded data of the multiple corresponding chunks; and in response to all of the data of the multiple corresponding chunks not being successfully decoded, determining whether to give up the decoding operation of the first chunk according to a syndrome weight of the first chunk and at least one syndrome weight of at least one corresponding chunk among the multiple corresponding chunks that is not successfully decoded.

According to an embodiment of the present invention, a memory device is provided, wherein the memory device comprises a flash memory module and a flash memory controller. The flash memory module comprises multiple data planes, wherein each of the multiple data planes comprises multiple blocks, each of the multiple blocks comprises multiple data pages, and each of the multiple data pages comprises multiple chunks. The flash memory controller is arranged to access the flash memory module, and perform the following steps: reading first data from a first chunk for performing a decoding operation, wherein the first chunk is located in a first data page of a super data page, and the super data page comprises the multiple data pages respectively located in the multiple data planes; in response to the first chunk failing to be decoded, obtaining data of multiple corresponding chunks of the first chunk, wherein the multiple corresponding chunks are respectively located in other data pages of the super data page except for the first data page; in response to all of the data of the multiple corresponding chunks being successfully decoded, generating decoded data of a specific chunk according to multiple decoded data of the multiple corresponding chunks; and in response to all of the data of the multiple corresponding chunks not being successfully decoded, determining whether to give up the decoding operation of the first chunk according to a syndrome weight of the first chunk and at least one syndrome weight of at least one corresponding chunk among the multiple corresponding chunks that is not successfully decoded.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
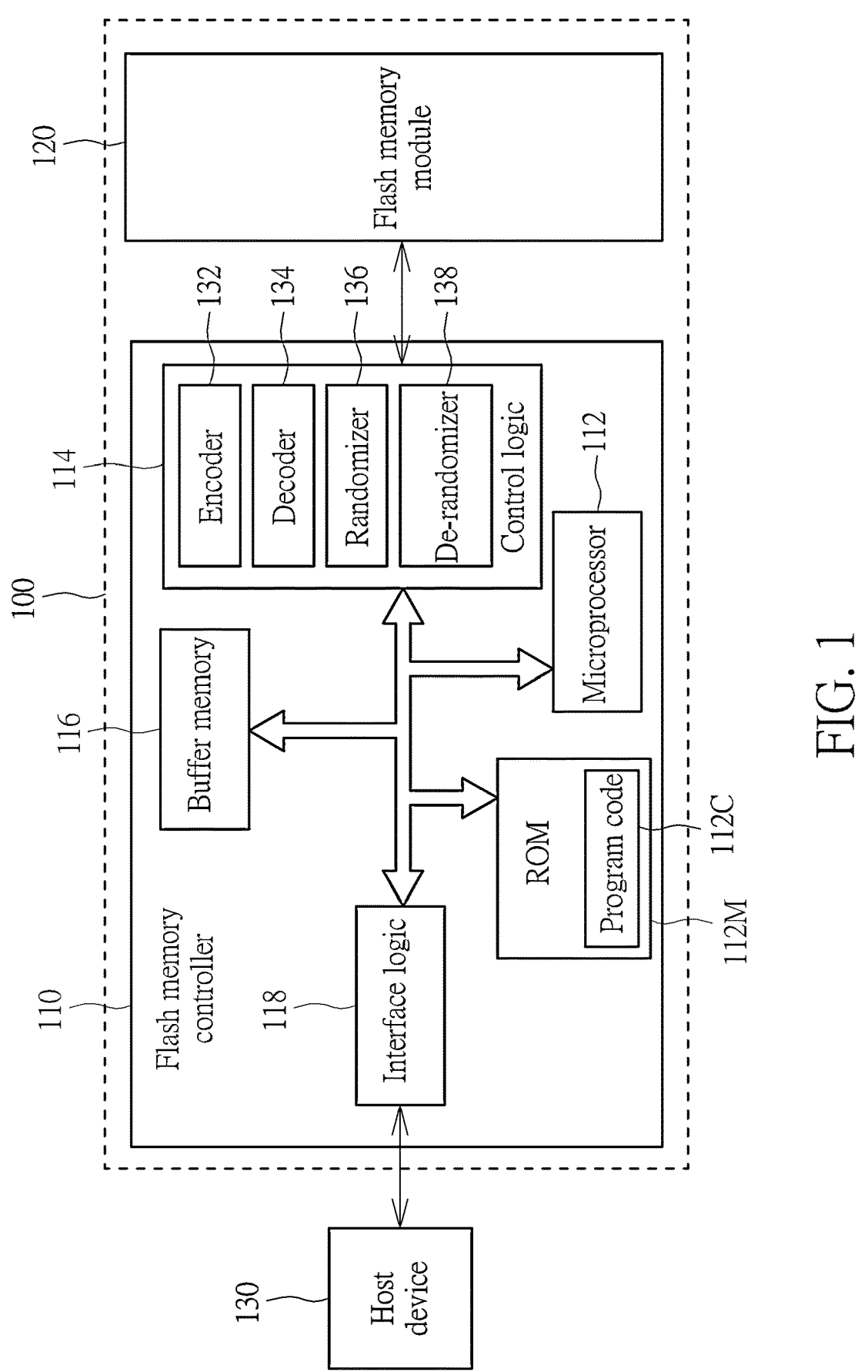
FIG. 1 is a diagram illustrating a memory device according to an embodiment of the present invention.

FIG. 1 is a diagram illustrating a memory device 100 according to an embodiment of the present invention. The memory device 100 includes a flash memory controller 110 and a flash memory module 120. The Flash memory controller 110 is arranged to access the flash memory module 120. In this embodiment, the flash memory controller 110 includes a microprocessor 112, a read only memory (ROM) 112M, a control logic 114, a buffer memory 116, and an interface logic 118. The ROM 112M is arranged to store a program code 112C. The microprocessor 112 is arranged to execute the program code 112C to control access of the flash memory module 120. The control logic 114 includes an encoder 132, a decoder 134, a randomizer 136, and a de-randomizer 138. The encoder 132 is arranged to encode data written into the flash memory module 120 to generate a corresponding check code (or an error correction code (ECC)). The decoder 134 is arranged to decode data read from the flash memory module 120. The randomizer 136 is arranged to perform a randomization operation upon data written into the flash memory module 120. The de-randomizer 138 is arranged to perform a de-randomization operation upon data read from the flash memory module 120.

The flash memory module 120 includes multiple flash memory chips, wherein each of the multiple flash memory chips includes a plurality of blocks, and the flash memory controller 110 may perform a copy operation, an erase operation, or a data merging operation upon the flash memory module 120 in units of blocks. In addition, a block may record a specific number of data pages, wherein the flash memory controller 110 may perform a data writing operation upon the flash memory module 120 in units of data pages. In other words, the minimum erase unit for the flash memory module 120 is a block, and the minimum writing unit for the flash memory module 120 is a data page.

In practice, the flash memory controller 110 that executes the program code 112C through the microprocessor 112 may utilize its own internal components to perform many control operations. For example, the flash memory controller 110 may utilize the control interface 114 to control access of the flash memory module 120 (more particularly, control access of at least one block or at least one data page), utilize the buffer memory 116 to perform a required buffering operation, and utilize the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 may be a solid state drive (SSD) or an embedded storage device conforming to the universal flash storage (UFS) or embedded multi-media card (EMMC) specifications, and may be arranged in an electronic device. For example, the memory device 100 may be arranged in a cellphone, a watch, a portable medical testing device (e.g., a medical bracelet), a laptop, or a desktop computer. In this case, the host device 130 may be a processor of the electronic device.

In this embodiment, the flash memory module 120 is a 3D NAND-type flash memory module, wherein each block is composed of multiple word lines, multiple bit lines, and multiple memory cells. Since architecture of the 3D NAND-type flash memory module is well known to those skilled in the art, further descriptions are omitted here.

Figure 2:
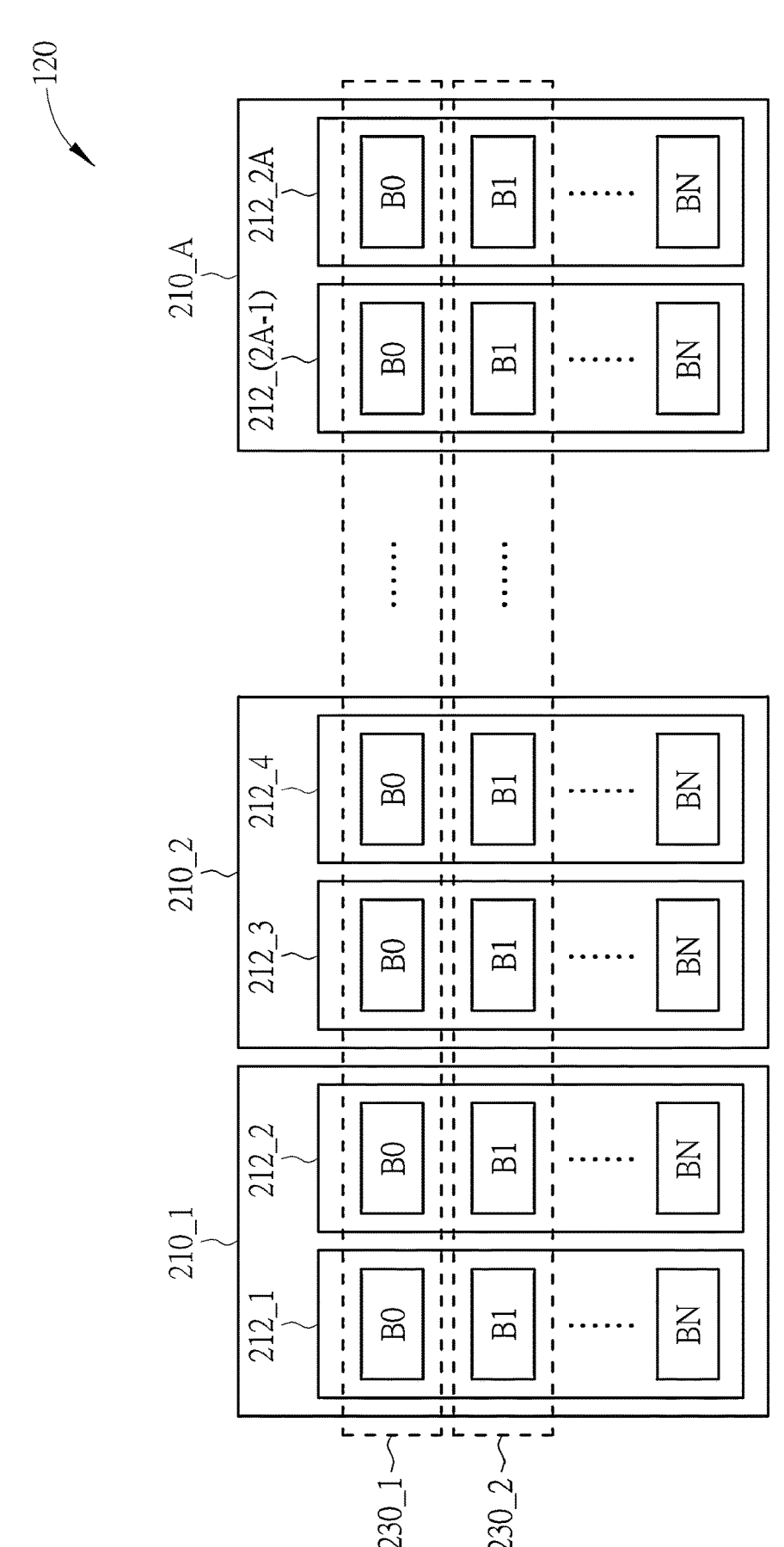
FIG. 2 is a diagram illustrating configuring blocks belonging to different data pages within a flash memory module as a super block.

The flash memory controller 110 may configure blocks belonging to different data planes within the flash memory module 120 as a super block, in order to facilitate the management of data access. FIG. 2 is a diagram illustrating the flash memory module 120 including multiple flash memory dies 210_1-210_A, wherein "A" may be any suitable positive integer (e.g., 2, 4, 6, 8, . . . ). Each flash memory die includes two data planes. For example, the flash memory die 210_1 includes two data planes 212_1 and 212_2, the flash memory die 210_2 includes two data planes 212_3 and 212_4, and the flash memory die 210_A includes two data planes 212_(2A-1) and 212_2A. In addition, each data plane includes multiple blocks B0-BN, wherein "N" may be any suitable positive integer (e.g., 64, 128, . . . ). In the initialization process of the flash memory module 120, the flash memory controller 110 may configure the $1^{st}$ block B0 of each data plane as a super block 230_1, configure the $2^{nd}$ block B1 of each data plane as a super block 230_2, and the rest may be deduced by analogy. As shown in FIG. 2, the super block 230_1 includes (2*A) physical blocks B0, and the way the flash memory controller 110 accesses the super block 230_1 is similar to the way it accesses a general block. The super block 230_1 itself is an erase unit. That is, although the (2*A) blocks B0 of the super block 230_1 can be erased separately, the flash memory controller 110 will definitely erase the (2*A) blocks B0 together.

Figure 3:
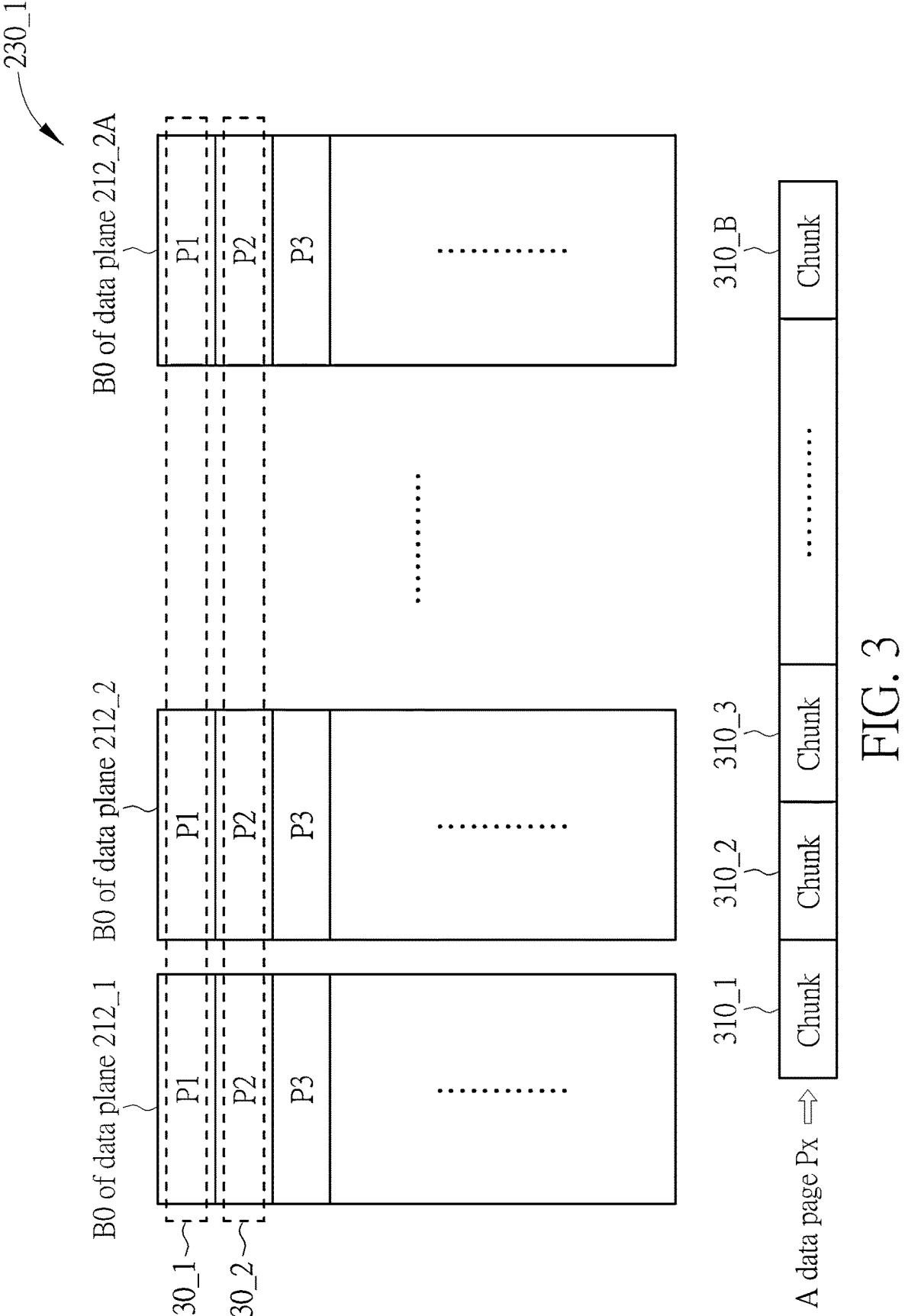
FIG. 3 is a diagram illustrating configuring a super data page.

In addition, the super block 230_1 may sequentially perform data writing upon the $1^{st}$ data page of the data plane 212_1, the $1^{st}$ data page of the data plane 212_2, the $1^{st}$ data page of the data plane 212_3, the $1^{st}$ data page of the data plane 212_4, . . . , the $1^{st}$ data page of the data plane 212_(2A-1), and the $1^{st}$ data page of the data plane 212_2A. After the data writing of the $1^{st}$ data page of the data plane 212_2A is completed, the data is sequentially written into the $2^{nd}$ data page of the data plane 212_1, the $2^{nd}$ data page of the data plane 212_2, . . . , and so on. Take FIG. 3 as an example. The flash memory controller 110 may configure data pages of blocks belonging to different data planes within each super block as a super data page, in order to facilitate the management of data access. As shown in FIG. 3, the flash memory controller 110 may configure the $1^{st}$ data page P1 of the block B0 of the data plane 212_1, the $1^{st}$ data page P1 of the block B0 of the data plane 212_2, . . . , and the $1^{st}$ data page P1 of the block B0 of the data plane 212_2A in the super block 230_1 as a super data page 330_1; configure the $2^{nd}$ data page P2 of the block B0 of the data plane 212_1, the $2^{nd}$ data page P2 of the block B0 of the data plane 212_2, . . . , and the $2^{nd}$ data page P2 of the block B0 of the data plane 212_2A in the super block 230_1 as a super block 330_2; and the rest may be deduced by analogy. In addition, each data page may include multiple chunks (or sectors) 310_1-310_B, wherein each chunk among the chunks 310_1-310_B may be regarded as a codec unit. That is, the encoder 132 may encode data to be written into the flash memory module 120 to generate encoded data for being written into a chunk, wherein the encoded data includes the data and a corresponding ECC. The decoder 134 may read data of a chunk from the flash memory module 120, and decode the data of the chunk to generate decoded data. For example, a size of a data page may be 16 kilo-bytes (KB) or 32 KB, and a size of a chunk may be 4 KB, but the present invention is not limited thereto.

In order to protect data of the flash memory module 120, the flash memory controller 110 may adopt a RAID encoding method when writing data into the flash memory module 120. Take embodiments of FIG. 2 and FIG. 3 as an example. In the super block 230_1, the block B0 of any data plane may be arranged to exclusively store check codes of other data planes. For example, the data page P1 of the block B0 of the data plane 212_2A is arranged to store a result of performing an exclusive OR (XOR) operation upon the data pages P1 of the blocks B0 of the data planes 212_1-212_ (2A-1), the data page P2 of the block B0 of the data plane 212_2A is arranged to store a result of performing an XOR operation upon the data pages P2 of the blocks B0 of the data planes 212_1-212_(2A-1), and the rest may be deduced by analogy. Take FIG. 4 as an example. Each data page includes multiple data D0, D1, D2, . . . , wherein each data may be a bit; the encoder 132 may perform an XOR operation upon the data D0 of the data page P1 of the block B0 of the data plane 212_1, the data D0 of the data page P1 of the block B0 of the data plane 212_2, . . . , and the data D0 of the data page P1 of the block B0 of the data plane 212_(2A-1), in order to generate an operational result for being written into the data page P1 of the block B0 of the data plane 212_2A as the data D0 thereof; the encoder 132 may perform an XOR operation upon the data D1 of the data page P1 of the block B0 of the data plane 212_1, the data D1 of the data page P1 of the block B0 of the data plane 212_2, . . . , and the data D1 of the data page P1 of the block B0 of the data plane 212_ (2A-1), in order to generate an operational result for being written into the data page P1 of the block B0 of the data plane 212_2A as the data D1 thereof; and the rest may be deduced by analogy. By the RAID encoding method shown in FIG. 4, no matter which data page P1 in the super data page 330_1 is unable to read data, the data page P1 can be restored by performing an XOR operation upon data of other data pages in the super data page 330_1.

Figure 5:
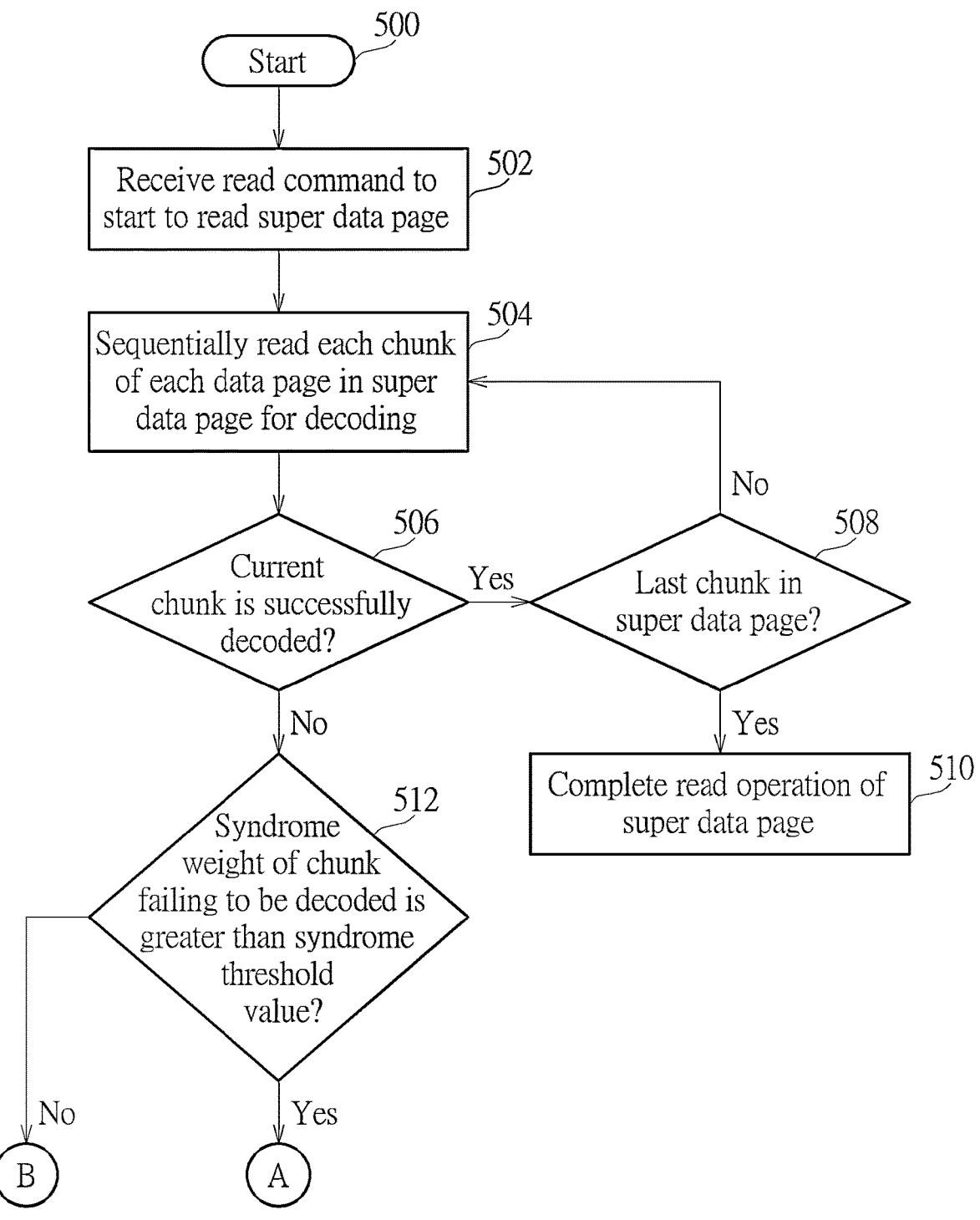
FIG. 5 is a flow chart of a method for accessing a flash memory module according to an embodiment of the present invention.
Figure 6:
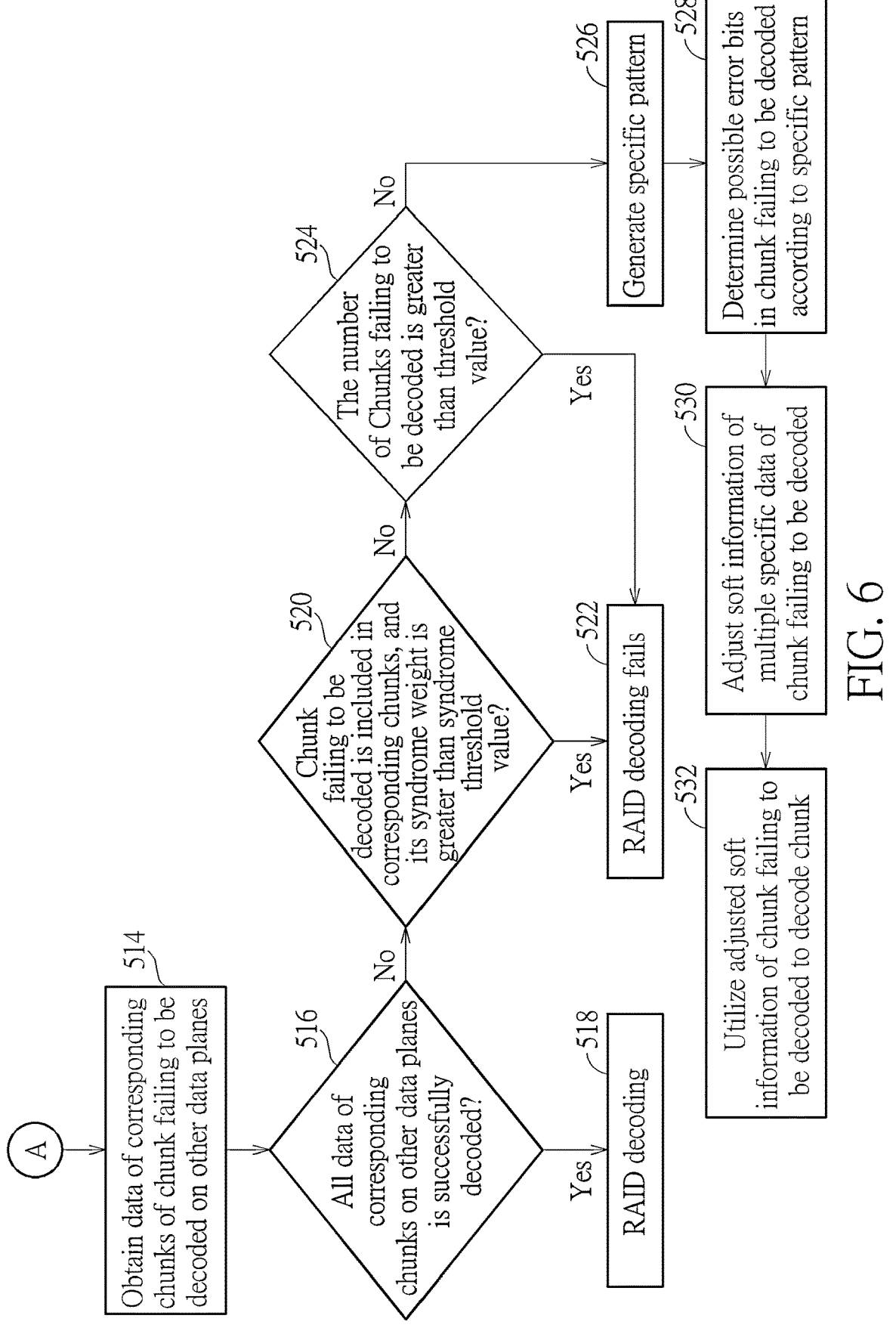
FIG. 6 is a flow chart of a method for accessing a flash memory module according to an embodiment of the present invention.
Figure 7:
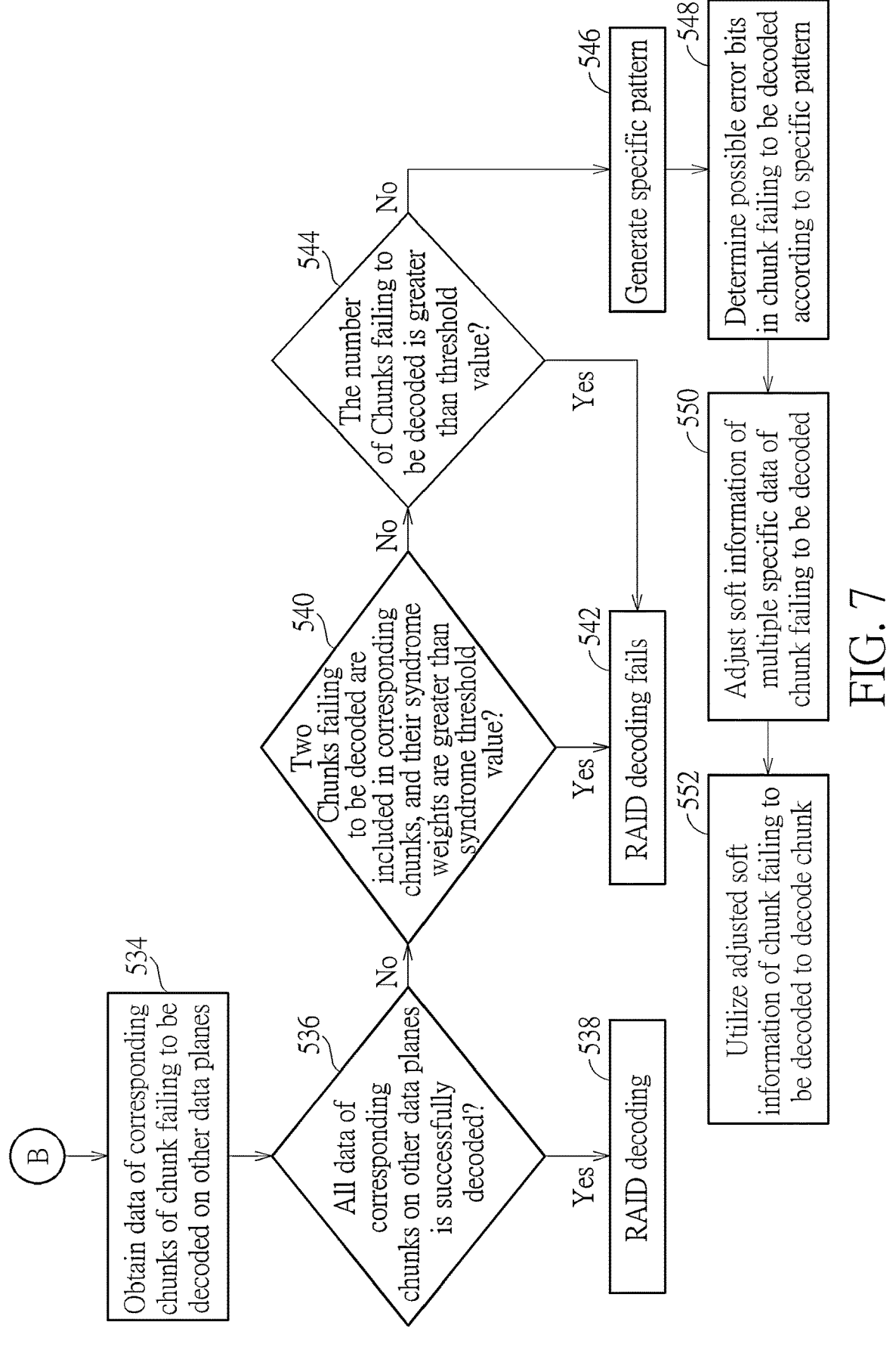
FIG. 7 is a flow chart of a method for accessing a flash memory module according to an embodiment of the present invention.

FIG. 5, FIG. 6, and FIG. 7 are flow charts of a method for accessing the flash memory module 120 according to an embodiment of the present invention.

In Step 500, the flow starts, the memory device 100 is powered on, and an initialization operation is completed.

Figure 4:
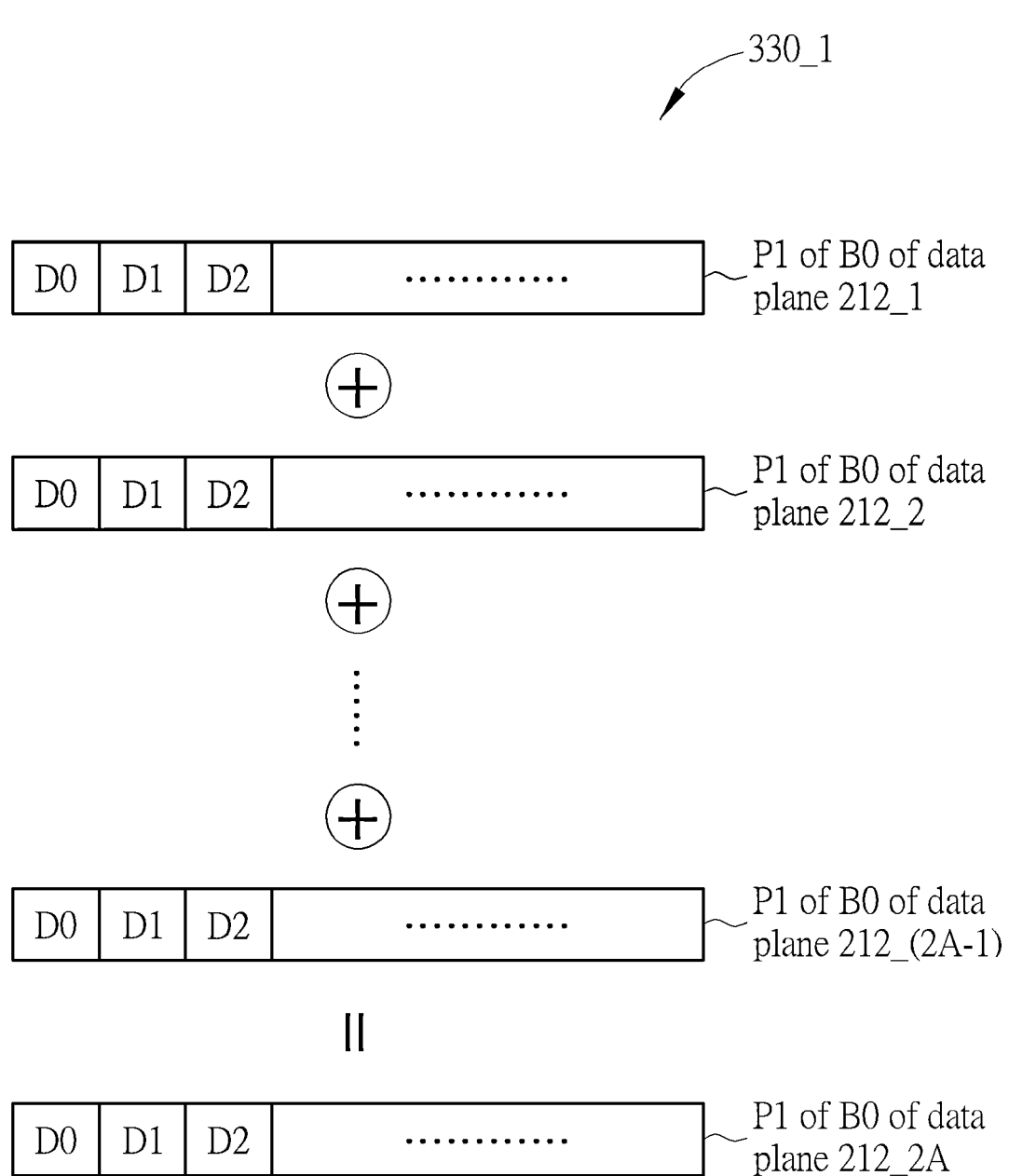
FIG. 4 is a diagram illustrating a RAID encoding method according to an embodiment of the present invention.

In Step 502, the microprocessor 112 receives a read command from the host device 130, in order to start to read a super data page. In the following embodiments, the super data page 330_1 shown in FIG. 3 and FIG. 4 is taken as an example.

In Step 504, the flash memory controller 110 sequentially reads each chunk of each data page in the super data page 330_1 for decoding. In this embodiment, the decoding process regarding each chunk of the flash memory controller 110 may include a hard decoding and a soft decoding, wherein the hard decoding may be a decoding method of a Bose-Chaudhuri-Hocquenghem (BCH) code or a decoding method of a low-density parity-check (LDPC) code, and the soft decoding may be the decoding method of the LDPC code.

Figure 8:
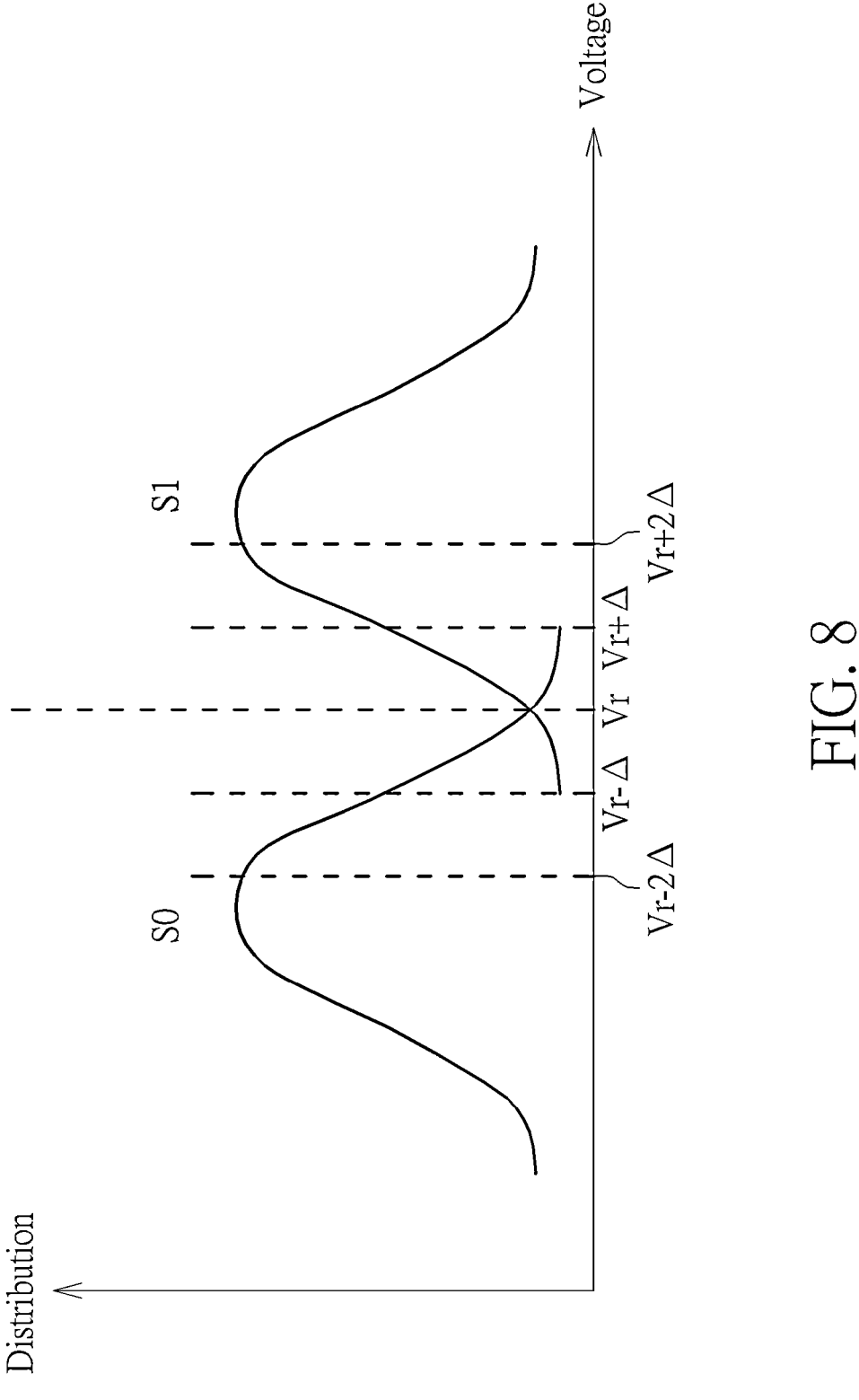
FIG. 8 is a diagram illustrating generating hard information and soft information according to an embodiment of the present invention.

Take FIG. 8 as an example. In FIG. 8, each memory unit of each chunk is arranged to store one bit. That is, the super data page 330_1 is a single-level cell (SLC) data page, but the present invention is not limited thereto. As shown in FIG. 8, the memory unit has a state among two states S0 and S1, wherein the state S0 corresponds to a logical value "0", and the state S1 corresponds to a logical value "1". A control circuit in the flash memory module 120 may utilize a read voltage Vr to read each memory unit for determining a logical value of the memory unit. If the memory unit is turned on when the read voltage Vr is applied, the control circuit determines that the memory unit corresponds to the logical value "1". If the memory unit is not turned on when the read voltage Vr is applied, the control circuit determines that the memory unit corresponds to the logical value "0". The logical value of each memory bit may be referred to as a sign bit, and multiple sign bits of all memory units corresponding to a chunk may be referred to as hard information. It should be noted that the sign bit of the memory unit determined by the flash memory module 120 may not be an actual logical value due to voltage distribution of the states S0 and S1. In addition, the decoder 134 may perform the hard decoding upon the hard information of a chunk in order to try to obtain decoded data. In response to the decoder 134 failing to decode the hard information, the flash memory controller 110 may be further arranged to control the flash memory module 120 to generate soft information for performing the soft decoding.

For example, the flash memory module 120 may read each memory unit of the chunk by utilizing read voltages (Vr+$\Delta$) and (Vr−$\Delta$), in order to determine a first soft bit of the memory unit. If the memory unit is turned on when the read voltage (Vr+$\Delta$) is applied, or the memory unit is not turned on when the read voltage (Vr−$\Delta$) is applied, the flash memory module 120 determines that the memory unit corresponds to a strong region, and the first soft bit of the memory unit is a strong bit "1". If the memory unit is turned on when the read voltage (Vr−$\Delta$) is applied, and the memory unit is not turned on when the read voltage (Vr+$\Delta$) is applied, the flash memory module 120 determines that the memory unit corresponds to a weak region, and the first soft bit of the memory unit is a weak bit "0". In addition, the flash memory module 120 may utilize read voltages (Vr+2*$\Delta$) and (Vr−2*$\Delta$) to read each memory unit of the chunk, in order to determine a second soft bit of the memory unit. If the memory unit is turned on when the read voltage (Vr+2*$\Delta$) is applied, or the memory unit is not turned on when the read voltage (Vr−2*$\Delta$) is applied, the flash memory module 120 determines that the memory unit corresponds to a strong region, and the second soft bit of the memory unit is a strong bit "1". If the memory unit is turned on when the read voltage (Vr−2*$\Delta$) is applied, and the memory unit is not turned on when the read voltage (Vr+2*Δ) is applied, the flash memory module 120 determines that the memory unit corresponds to a weak region, and the second soft bit of the memory unit is a weak bit "0". Multiple first soft bits and multiple second soft bits of all memory units corresponding to the chunk may be referred to as soft information. After obtaining soft information of the chunk, the decoder 134 may perform the soft decoding by utilizing the hard information and the soft information of the chunk, in order to try to obtain the decoded data.

In Step 506, the decoder 134 determines whether the current chunk is successfully decoded. If Yes, Step 508 is entered; if No, Step 512 is entered. In this embodiment, the decoder 134 may determine whether the soft decoding can be performed by utilizing the hard information and the soft information of the chunk in order to successfully generate the decoded data.

In Step 508, the decoder 134 determines whether the last chunk of the super data page 330_1 has been decoded. If Yes, Step 510 is entered to complete the decoding operation of the super data page 330_1; if No, Step 504 is returned to continue to decode the next chunk.

In Step 512, the decoder 134 determines whether a syndrome or a syndrome weight of a chunk failing to be decoded is greater than a syndrome threshold value. If Yes, Step 514 is entered; if No, Step 534 is entered. It should be noted that the syndrome weight is a number of specific parity check equations that are not satisfied during the decoding process, and may be arranged to reflect data quality, wherein a smaller value of the syndrome weight represents the data quality is better (i.e., the number of error bits of the data in the chunk is smaller), and a greater value of the syndrome weight represents the data quality is worse (i.e., the number of error bits of the data in the chunk is larger). In this embodiment, the syndrome weight being greater than the syndrome threshold value represents there are serious errors in the data of the chunk, and the decoding operation cannot be performed via the LDPC decoding method. In addition, since the meaning and the calculation method of the syndrome and the syndrome weight are well known to those skilled in the art (see, for example, U.S. patent application publication No. US20190158115 and Taiwan patent publication No. TWI718060), details of related calculation are omitted here.

For better comprehension, the above-mentioned chunk failing to be decoded is described by an uncorrectable error correction code (UECC) chunk in the following paragraphs.

In Step 514, the decoder 134 sequentially obtains data of corresponding chunks of the UECC chunk on other data planes. If the UECC chunk mentioned in Steps 506 and 512 is the chunk 310_1 of the data page P1 of the block B0 of the data plane 212_1 shown in FIG. 3, the flash memory controller 110 requires obtaining the chunk 310_1 of the data page P1 of the block B0 of each data plane among the data planes 212_2-212_2A. If the UECC chunk mentioned in Steps 506 and 512 is the chunk 310_1 of the data page P1 of the block B0 of the data plane 212_2A shown in FIG. 3, the flash memory controller 110 requires obtaining the chunk 310_1 of the data page P1 of the block B0 of each data plane among the data planes 212_1-212_(2A-1). In addition, regarding obtaining the data of corresponding chunks of the UECC chunk on other data planes, if the control logic 114 or the buffer memory 116 already has related data, the decoder 134 may directly read from said device; and if the control logic 114 or the buffer memory 116 does not yet have the related data, the decoder 134 requires reading from the flash memory module 120 for decoding.

In Step 516, the decoder 134 determines whether the data of corresponding chunks of the UECC chunk on other data planes is successfully decoded (i.e., whether the UECC chunk in the super data page 330_1 is the only chunk which fails to be decoded). If Yes, Step 518 is entered; if No, Step 520 is entered.

In Step 518, the decoder 134 performs the decoding operation via the RAID decoding method. That is, the decoder 134 performs the XOR operation upon the data of corresponding chunks of the UECC chunk on other data planes in order to generate an XOR operational result for acting as the decoded data of the UECC chunk. Take FIG. 4 as an example. If the chunk 310_1 of the data page P1 of the block B0 of the data plane 212_1 is the UECC chunk, the decoder 134 may perform the XOR operation upon the chunk 310_1 of the data page P1 of the block B0 of each data plane among the data planes 212_2-212_2A, in order to generate the decoded data of the chunk 310_1 of the data page P1 of the block B0 of the data plane 212_1.

In Step 520, the decoder 134 determines whether there is another chunk being the UECC chunk (i.e., whether the syndrome or the syndrome weight of another chunk is greater than the syndrome threshold value) during the process of obtaining the data of corresponding chunks of the UECC chunk on other data planes. If Yes, Step 522 is entered; if No, Step 524 is entered.

In Step 522, the decoder 134 determines that the data of the UECC chunk fails to be decoded via the RAID decoding method, and the decoding of the UECC chunk is given up.

In Step 524, the microprocessor 112 or the decoder 134 determines whether the number of UECC chunks of the super data page 330_1 in operations of Steps 506 and 514 is greater than a threshold value. If Yes, Step 522 is entered; if No, Step 526 is entered. In this embodiment, the threshold value may be any suitable positive integer less than "2A".

Figure 9:
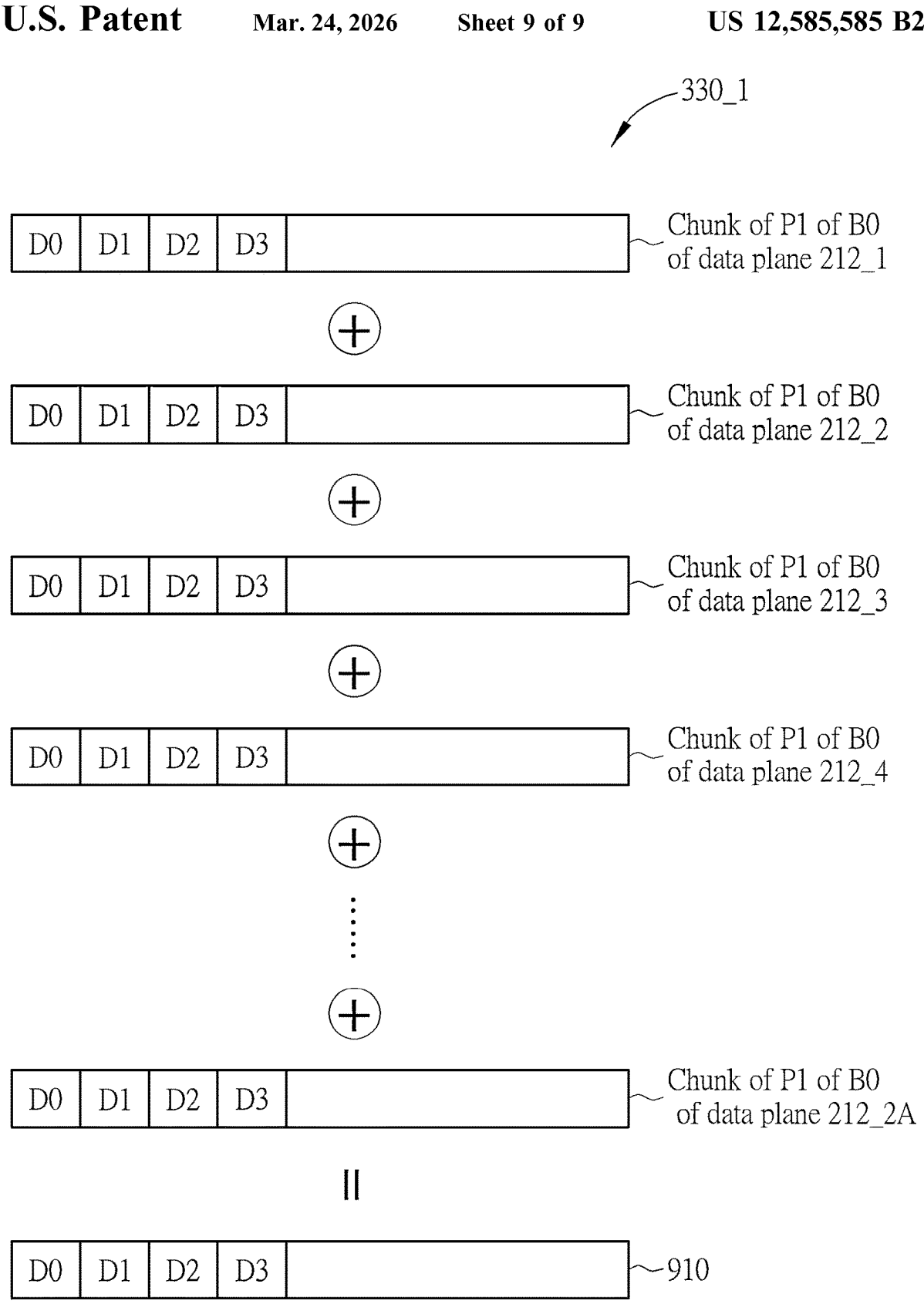
FIG. 9 is a diagram illustrating generating a specific pattern according to an embodiment of the present invention.

In Step 526, the microprocessor 112 or the decoder 134 generates a specific pattern according to contents of all chunks of the super data page 330_1 in the operations of Steps 506 and 514 (e.g., contents of the chunk 310_1 of the data page P1 of the block B0 of each data plane among the data planes 212_1-212_2A), wherein the specific pattern is a possible error pattern, and the specific pattern indicates which bit in the UECC chunk is incorrect. Specifically, refer to FIG. 9. The microprocessor 112 or the decoder 134 may perform an XOR operation upon contents of the chunk 310_1 of the data page P1 of the block B0 of each data plane among the data planes 212_1-212_2A in order to generate a specific pattern 910. That is, the microprocessor 112 or the decoder 134 may perform an XOR operation upon data D0 of the data page P1 of the block B0 of each data plane among the data planes 212_1-212_2A in order to generate data D0 of the specific pattern 910, perform an XOR operation upon data D1 of the data page P1 of the block B0 of each data plane among the data planes 212_1-212_2A in order to generate data D1 of the specific pattern 910, and the rest may be deduced by analogy. It should be noted that, for each chunk in the embodiment of FIG. 9, if the chunk can be successfully decoded via the decoder 134, the contents of the chunk for calculating the specific pattern 910 may be the decoded data (i.e., correct data) or data before decoding (i.e., data including a small number of error bits); and if the chunk is the UECC chunk, the contents of the chunk for calculating the specific pattern 910 may be the data before decoding.

In Step 528, the microprocessor 112 or the decoder 134 determines possible error bits in the UECC chunk according to the specific pattern 910. Refer to the embodiment of FIG. 9 in conjunction with FIG. 4. Since the data page P1 of the block B0 of the data plane 212_2A is arranged to store a result of performing an XOR operation upon the data pages P1 of the blocks B0 of the data planes 212_1-212_(2A-1), if all of the chunks 310_1 can be successfully decoded, each data in the specific pattern 910 may be "0". If "1" appears in the specific pattern 910, it means that the corresponding data in the above chunk may be incorrect. Assume that the data D0 of the specific pattern 910 is "1", and at least one data D0 among the data D0 of the data pages P1 of the blocks B0 of the data planes 212_1-212_2A is wrong. As a result, the microprocessor 112 or the decoder 134 may determine multiple specific data with error bits in the UECC chunk according to data with "1" in the specific pattern 910. That is, if the data D0 of the specific pattern 910 is "1", the UECC chunk determined in Steps 506 and 512 and the data D0 of the UECC chunk determined in Steps 514-524 may be wrong.

In Step 530, the decoder 134 at least adjusts soft information of multiple specific data of the UECC chunk to generate adjusted soft information, wherein compared with the original soft information, the adjusted soft information may selectively and greatly reduce reliability of hard information of each specific data. Take FIG. 8 as an example. Assume that the hard information, the first soft bit, and the second soft bit of specific data of the UECC chunk are (1, 1, 1), respectively, and the hard information, an adjusted first soft bit, and an adjusted second soft bit may be (1, 0, 0), respectively, wherein the adjusted first soft bit and the adjusted second soft bit are included in the adjusted soft information.

In an embodiment, since data with "0" corresponding to the specific pattern 910 in the UECC chunk has a low probability of being wrong, the decoder 134 may adjust soft information of other data of the UECC chunk except for the multiple specific data (i.e., the data with "0" corresponding to the specific pattern 910) in order to generate adjusted soft information, wherein compared with the original soft information, the adjusted soft information may selectively and slightly reduce reliability of hard information of each data. Refer to FIG. 8. Assume that the hard information, the first soft bit, and the second bit of data of the UECC chunk are (1, 1, 1), respectively, and the hard information, an adjusted first soft bit, and an adjusted second soft bit may be (1, 1, 0), respectively, wherein the adjusted first soft bit and the adjusted second soft bit are included in the adjusted soft information.

In Step 532, the decoder 134 utilizes the adjusted soft information of the UECC chunk to decode the UECC chunk, in order to obtain decoded data.

Regarding the flow shown in FIG. 7, since operations of Steps 534, 536, and 538 are similar to that of Steps 514, 516, and 518, similar descriptions are not repeated in detail here.

In Step 540, it is determined whether there are another two chunks being the UECC chunk (i.e., whether the syndromes or the syndrome weights of another two chunks are greater than the syndrome threshold value) during the process of obtaining the data of corresponding chunks of the UECC chunk on other data planes. If Yes, Step 542 is entered; if No, Step 544 is entered. In addition, since operations of Steps 542-552 are similar to that of Steps 522-532, similar descriptions are not repeated in detail here.

In the embodiments of FIG. 5, FIG. 6, and FIG. 7, the operations of Steps 528-532 and Steps 518-552 are performed according to the UECC chunk determined in Steps 506 and 512, but the present invention is not limited thereto. In other embodiments, since other UECC chunks may be determined in Steps 514-524 or Steps 534-544, the operations of Steps 528-532 and Steps 518-552 may also be simultaneously performed according to these UECC chunks, in order to accelerate the overall efficiency.

In this way, the control method of the memory device and associated apparatus of the present invention can greatly reduce the probability that the flash memory cannot be successfully decoded by the LDPC code when being read, thus solving the issues of the related art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a memory device, wherein the memory device comprises a flash memory module, the flash memory module comprises multiple data planes, each of the multiple data planes comprises multiple blocks, each of the multiple blocks comprises multiple data pages, each of the multiple data pages comprises multiple chunks, and the control method comprises:

reading first data from a first chunk for performing a decoding operation, wherein the first chunk is located in a first data page of a super data page, and the super data page comprises the multiple data pages respectively located in the multiple data planes;

in response to the first chunk failing to be decoded, obtaining data of multiple corresponding chunks of the first chunk, wherein the multiple corresponding chunks are respectively located in other data pages of the super data page except for the first data page;

in response to all of the data of the multiple corresponding chunks being successfully decoded, generating decoded data of the first chunk according to multiple decoded data of the multiple corresponding chunks; and in response to the data of the multiple corresponding chunks not being all successfully decoded, determining whether to give up the decoding operation of the first chunk according to a syndrome weight of the first chunk and at least one syndrome weight of at least one corresponding chunk among the multiple corresponding chunks that is not successfully decoded.

2. The control method of claim 1, wherein the step of determining whether to give up the decoding operation of the first chunk according to the syndrome weight of the first chunk and the at least one syndrome weight of the at least one corresponding chunk among the multiple corresponding chunks that is not successfully decoded in response to the data of the multiple corresponding chunks not being all successfully decoded comprises:

in response to syndrome weights of at least two chunks among the first chunk and the multiple corresponding chunks being greater than a syndrome threshold value, giving up the decoding operation of the first chunk; and in response to a number of chunks among the first chunk and the multiple corresponding chunks with a syndrome weight greater than the syndrome threshold value being less than two, adjusting contents of the first data in order to generate an adjusted first data, and performing decoding upon the adjusted first data.

3. The control method of claim 2, wherein the step of adjusting the contents of the first data in order to generate the adjusted first data, and performing decoding upon the adjusted first data comprises:

generating a specific pattern according to the first data of the first chunk and the data of the multiple corresponding chunks, wherein the specific pattern indicates which bit in the first data of the first chunk is incorrect; and adjusting the contents of the first data according to the specific pattern.

4. The control method of claim 3, wherein the step of generating the specific pattern according to the first data of the first chunk and the data of the multiple corresponding chunks comprises:

performing an exclusive OR (XOR) operation upon the first data of the first chunk and the data of the multiple corresponding chunks in order to generate the specific pattern.

5. The control method of claim 3, wherein the first data comprises multiple hard information and multiple soft information respectively corresponding to multiple memory units, and the step of adjusting the contents of the first data according to the specific pattern comprises:

adjusting at least one portion of the multiple soft information in the first data according to the specific pattern, in order to reduce reliability of corresponding hard information represented by the at least one portion of the multiple soft information.

6. A flash memory controller, wherein the flash memory controller is arranged to access a flash memory module, the flash memory module comprises multiple data planes, each of the multiple data planes comprises multiple blocks, each of the multiple blocks comprises multiple data pages, each of the multiple data pages comprises multiple chunks, and the flash memory controller comprises:

a read only memory, arranged to store a program code;

a buffer memory; and a microprocessor, arranged to execute the program code to control access of the flash memory module;

wherein the microprocessor is arranged to perform the following steps:

reading first data from a first chunk for performing a decoding operation, wherein the first chunk is located in a first data page of a super data page, and the super data page comprises the multiple data pages respectively located in the multiple data planes;

in response to the first chunk failing to be decoded, obtaining data of multiple corresponding chunks of the first chunk, wherein the multiple corresponding chunks are respectively located in other data pages of the super data page except for the first data page;

in response to all of the data of the multiple corresponding chunks being successfully decoded, generating decoded data of the first chunk according to multiple decoded data of the multiple corresponding chunks; and in response to the data of the multiple corresponding chunks not being all successfully decoded, determining whether to give up the decoding operation of the first chunk according to a syndrome weight of the first chunk and at least one syndrome weight of at least one corresponding chunk among the multiple corresponding chunks that is not successfully decoded.

7. The flash memory controller of claim 6, wherein the step of determining whether to give up the decoding operation of the first chunk according to the syndrome weight of the first chunk and the at least one syndrome weight of the at least one corresponding chunk among the multiple corresponding chunks that is not successfully decoded in response to the data of the multiple corresponding chunks not being all successfully decoded comprises:

in response to syndrome weights of at least two chunks among the first chunk and the multiple corresponding chunks being greater than a syndrome threshold value, giving up the decoding operation of the first chunk; and in response to a number of chunks among the first chunk and the multiple corresponding chunks with a syndrome weight greater than the syndrome threshold value being less than two, adjusting contents of the first data in order to generate an adjusted first data, and performing decoding upon the adjusted first data.

8. The flash memory controller of claim 7, wherein the step of adjusting the contents of the first data in order to generate the adjusted first data, and performing decoding upon the adjusted first data comprises:

generating a specific pattern according to the first data of the first chunk and the data of the multiple corresponding chunks, wherein the specific pattern indicates which bit in the first data of the first chunk is incorrect; and adjusting the contents of the first data according to the specific pattern.

9. The flash memory controller of claim 8, wherein the step of generating the specific pattern according to the first data of the first chunk and the data of the multiple corresponding chunks comprises:

performing an exclusive OR (XOR) operation upon the first data of the first chunk and the data of the multiple corresponding chunks in order to generate the specific pattern.

10. The flash memory controller of claim 8, wherein the first data comprises multiple hard information and multiple soft information respectively corresponding to multiple memory units, and the step of adjusting the contents of the first data according to the specific pattern comprises:

adjusting at least one portion of the multiple soft information in the first data according to the specific pattern, in order to reduce reliability of corresponding hard information represented by the at least one portion of the multiple soft information.

11. A memory device, comprising:

a flash memory module, wherein the flash memory module comprises multiple data planes, each of the multiple data planes comprises multiple blocks, each of the multiple blocks comprises multiple data pages, and each of the multiple data pages comprises multiple chunks; and a flash memory controller, arranged to access the flash memory module;

wherein the flash memory controller is arranged to perform the following steps:

reading first data from a first chunk for performing a decoding operation, wherein the first chunk is located in a first data page of a super data page, and the super data page comprises the multiple data pages respectively located in the multiple data planes;

in response to the first chunk failing to be decoded, obtaining data of multiple corresponding chunks of the first chunk, wherein the multiple corresponding chunks are respectively located in other data pages of the super data page except for the first data page;

in response to all of the data of the multiple corresponding chunks being successfully decoded, generating decoded data of the first chunk according to multiple decoded data of the multiple corresponding chunks; and in response to the data of the multiple corresponding chunks not being all successfully decoded, determining whether to give up the decoding operation of the first chunk according to a syndrome weight of the first chunk and at least one syndrome weight of at least one corresponding chunk among the multiple corresponding chunks that is not successfully decoded.

12. The memory device of claim 11, wherein the step of determining whether to give up the decoding operation of the first chunk according to the syndrome weight of the first chunk and the at least one syndrome weight of the at least one corresponding chunk among the multiple corresponding chunks that is not successfully decoded in response to the data of the multiple corresponding chunks not being all successfully decoded comprises:

in response to syndrome weights of at least two chunks among the first chunk and the multiple corresponding chunks being greater than a syndrome threshold value, giving up the decoding operation of the first chunk; and in response to a number of chunks among the first chunk and the multiple corresponding chunks with a syndrome weight greater than the syndrome threshold value being less than two, adjusting contents of the first data in order to generate an adjusted first data, and performing decoding upon the adjusted first data.

13. The memory device of claim 12, wherein the step of adjusting the contents of the first data in order to generate the adjusted first data, and performing decoding upon the adjusted first data comprises:

generating a specific pattern according to the first data of the first chunk and the data of the multiple corresponding chunks, wherein the specific pattern indicates which bit in the first data of the first chunk is incorrect; and adjusting the contents of the first data according to the specific pattern.

14. The memory device of claim 13, wherein the step of generating the specific pattern according to the first data of the first chunk and the data of the multiple corresponding chunks comprises:

performing an exclusive OR (XOR) operation upon the first data of the first chunk and the data of the multiple corresponding chunks in order to generate the specific pattern.

15. The memory device of claim 13, wherein the first data comprises multiple hard information and multiple soft information respectively corresponding to multiple memory units, and the step of adjusting the contents of the first data according to the specific pattern comprises:

adjusting at least one portion of the multiple soft information in the first data according to the specific pattern, in order to reduce reliability of corresponding hard information represented by the at least one portion of the multiple soft information.

* * * * *